(12) United States Patent
Wainner et al.

(10) Patent No.: US 9,419,845 B2
(45) Date of Patent: Aug. 16, 2016

(54) DYNAMIC CONTENT DISTRIBUTION NETWORK SELECTION BASED ON CONTEXT FROM TRANSIENT CRITERIA

(71) Applicant: Cisco Technology, Inc., San Jose, CA (US)

(72) Inventors: Warren Scott Wainner, Sterling, VA (US); Aeneas Dodd-Noble, Andover, MA (US); Mahesh Vittal Viveganandhan, Cupertino, CA (US); Stefano Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 262 days.

(21) Appl. No.: 13/929,369

(22) Filed: Jun. 27, 2013

(65) Prior Publication Data
US 2015/0006615 A1    Jan. 1, 2015

(51) Int. Cl.
*G06F 15/173* (2006.01)
*H04L 29/06* (2006.01)
*H04L 29/08* (2006.01)

(52) U.S. Cl.
CPC .......... *H04L 29/06047* (2013.01); *H04L 67/02* (2013.01); *H04L 67/1021* (2013.01); *H04L 67/18* (2013.01); *H04L 69/22* (2013.01); *H04L 67/289* (2013.01); *H04L 67/2814* (2013.01); *H04L 67/2842* (2013.01)

(58) Field of Classification Search
CPC ....... H04L 67/42; H04L 41/509; H04L 47/70; H04L 67/2842; H04L 67/2852
See application file for complete search history.

(56) References Cited

U.S. PATENT DOCUMENTS

| | | | |
|---|---|---|---|
| 6,862,624 B2 | 3/2005 | Colby et al. | |
| 6,920,498 B1 | 7/2005 | Gourlay et al. | |
| 7,349,969 B2 | 3/2008 | Gourlay et al. | |
| 7,610,280 B2 | 10/2009 | O'Toole et al. | |
| 7,870,282 B2 | 1/2011 | Jonsson et al. | |
| 7,996,535 B2 | 8/2011 | Auerbach | |
| 2007/0055765 A1* | 3/2007 | Lisiecki et al. | 709/223 |
| 2009/0234965 A1 | 9/2009 | Viveganandhan et al. | |
| 2009/0234968 A1* | 9/2009 | Thomas et al. | 709/241 |

(Continued)

OTHER PUBLICATIONS

Gottar, et al., "Notification of Transmittal of the International Search Report and the Written Opinion of the International Searching Authority, or the Declaration", PCT/US2014/044723, Nov. 25, 2014, 11 pages, Patent Cooperation Treaty, European Patent Office, Rijswijk, Netherlands.

*Primary Examiner* — Peling Shaw
(74) *Attorney, Agent, or Firm* — Parker Ibrahim & Berg LLC; James M. Behmke; Stephen D. LeBarron

(57) ABSTRACT

In one embodiment, a client device queries a location server using a client-selected interface for content retrieval from a content distribution network (CDN), and receives a location attribute from the location server based on a location of the client device. The client device then presents the location attribute to a CDN selector within a first content retrieval request, and may receive a redirection from the CDN selector to a selected content source based on the location attribute. As such, the client device may then initiate a second content retrieval request to the selected content source. In another embodiment, a CDN selector receives a content retrieval request from a client device, and determines that the content retrieval request contains a location attribute indicating a location of the client device. Based on the location attribute, the CDN selector selects a content source, and redirects the client device to the selected content source.

16 Claims, 7 Drawing Sheets

(56) References Cited

U.S. PATENT DOCUMENTS

| | | |
|---|---|---|
| 2011/0131290 A1 | 6/2011 | Kim et al. |
| 2011/0271007 A1* | 11/2011 | Wang et al. .................. 709/238 |
| 2011/0295942 A1 | 12/2011 | Raghunath et al. |
| 2011/0320554 A1* | 12/2011 | Melander et al. ............. 709/206 |
| 2012/0254432 A1 | 10/2012 | Roseborough et al. |
| 2012/0259946 A1* | 10/2012 | Stockhammer et al. ...... 709/217 |
| 2012/0284756 A1* | 11/2012 | Kotecha et al. ................. 725/68 |
| 2013/0132544 A1 | 5/2013 | Krishnan et al. |

\* cited by examiner

DYNAMIC CONTENT DISTRIBUTION NETWORK SELECTION BASED ON CONTEXT FROM TRANSIENT CRITERIA

TECHNICAL FIELD

The present disclosure relates generally to computer networks, and, more particularly, to content distribution network (CDN) selection.

BACKGROUND

The distribution of content often relies upon a content distribution network (CDN) where content is cached closer to the client such that the load demands are off-loaded from an Origin Server. In practice, a content provider or content aggregator will typically refer to a designated CDN that is authorized to distribute the content. From a practical perspective, the designated CDN can only reach a footprint of coverage where it has deployed cache-nodes.

The industry has leveraged global CDN's to distribute content across the Internet; however, these designated CDN's are rarely allowed to insert cache-nodes inside a network provider's infrastructure. In fact, many of the larger network providers are building their own CDN infrastructure in order to control content distribution within its own routed domain. The network provider CDN will either need to serve as a designated CDN from the content provider (clients referred to the CDN explicitly) or serve as a delegate CDN to an upstream designated CDN.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
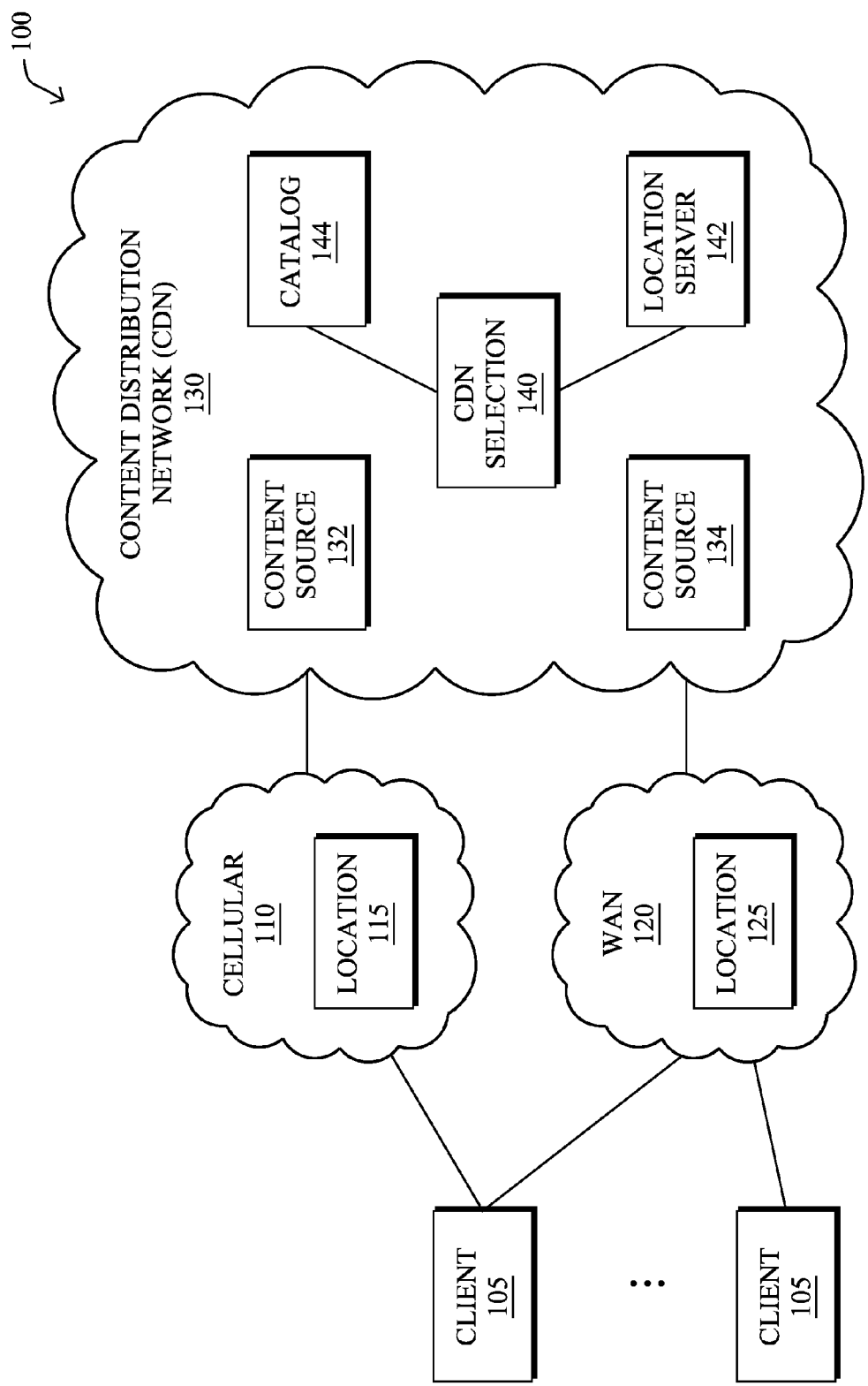
FIG. 1 illustrates an example computer network in which a content distribution network (CDN) may be implemented.

According to one or more embodiments of the disclosure, a client device queries a location server using a client-selected interface for content retrieval from a content distribution network (CDN), and receives a location attribute from the location server based on a location of the client device. The client device then presents the location attribute to a CDN selector within a first content retrieval request, and in response, may receive a redirection from the CDN selector to a selected content source based on the location attribute. As such, the client device may then initiate a second content retrieval request to the selected content source.

According to one or more additional embodiments of the disclosure, a CDN selector receives a content retrieval request from a client device, and determines that the content retrieval request contains a location attribute indicating a location of the client device. Based on the location attribute, the CDN selector selects a content source, and redirects the client device to the selected content source.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a router used to interconnect multiple domains is generally referred to as a "border router" or BR. In the case of areas rather than ASes since the routers are under a common authority, a single router may in fact serve as an exit border router of one area and an entry border router of another area.

FIG. 1 is a schematic block diagram of an exemplary computer network 100 comprising one or more client devices 105 interconnected via various communication networks, such as a cellular network 110 (e.g., 3G, 4G, etc.), a WAN 120, and other options as will be appreciated by those skilled in the art. Notably, the clients 105 may be mobile devices (e.g., phones, tablets, laptops, etc.) with the ability to physically change location and associated networks, and/or stationary devices that may change network locations (e.g., multi-homed devices).

The clients may participate in a content distribution (or delivery) network (CDN) infrastructure, which comprises a CDN network 130, and associated components as described below. For instance, the network 100 may comprise network location servers 115 and 125, content sources 132 and 134, and various CDN management devices, such as a CDN selector 140, centralized location server 142, and content catalog 144. Those skilled in the art will understand that any number of nodes, devices, links, etc. may be used in the computer network, and that the view shown herein is for simplicity. Also, while the CDN network 130 is shown as a separate "cloud", those skilled in the art will appreciate that a CDN network is a conceptual organization of devices that may be dispersed throughout various network entities, and the view shown herein is not meant to be limiting to the disclosure.

Data packets 140 (e.g., discrete frames or packets of data) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. In this context, a protocol consists of a set of rules defining how the nodes interact with each other.

Figure 2:
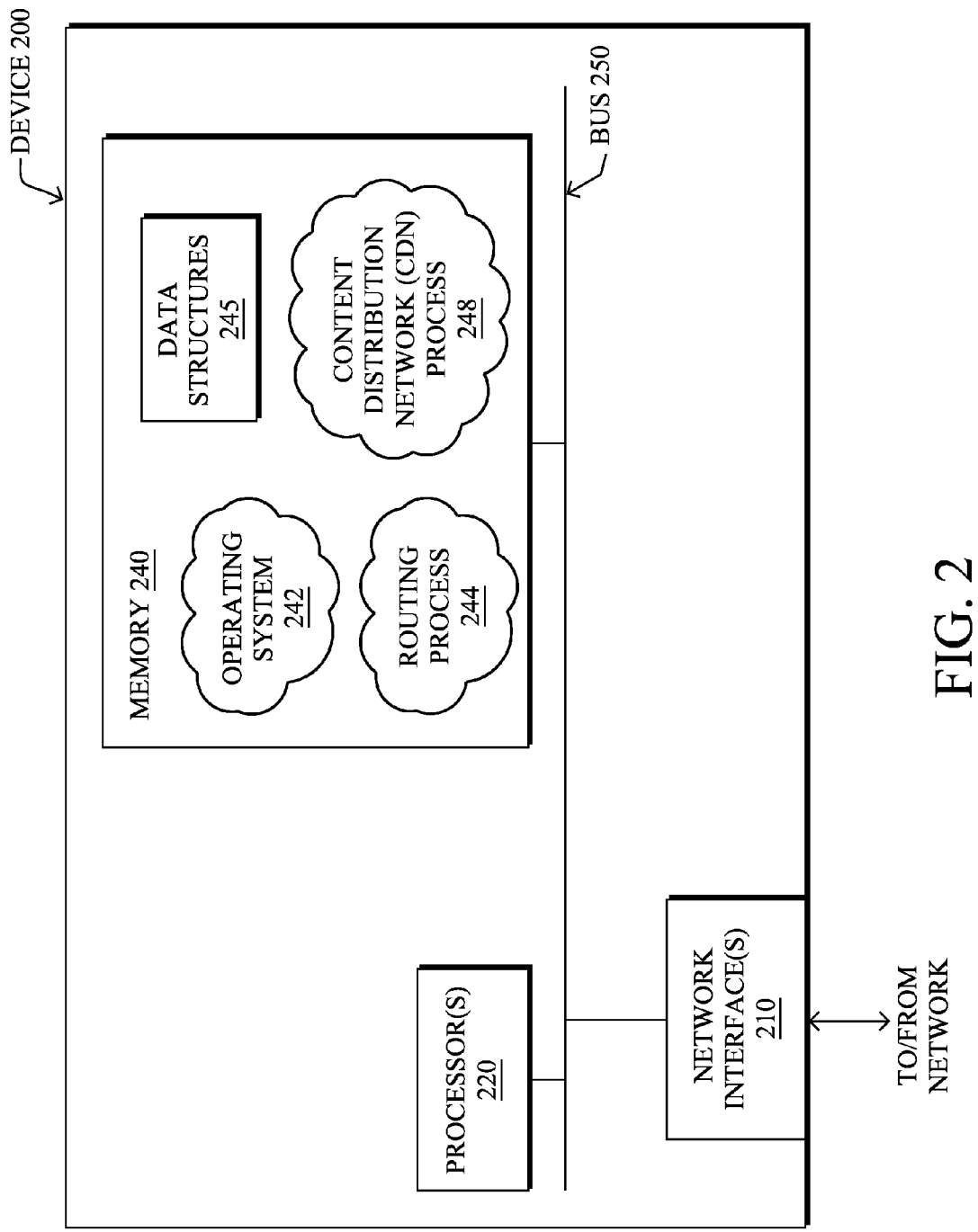
FIG. 2 illustrates an example network device/node.

FIG. 2 is a schematic block diagram of an example node/device (e.g., router) 200 that may be used with one or more embodiments described herein, e.g., as any of the devices in FIG. 1 above. The device may comprise one or more network interfaces 210, at least one processor 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols, including, inter alia, TCP/IP, UDP, ATM, synchronous optical networks (SO-NET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245, such as routing databases, local caches, tables, lists, mappings, etc. An operating system 242, portions of which are typically resident in memory 240 and executed by the processor, functionally organizes the device by, among other things, invoking operations in support of software processes and/or services executing on the device. These software processes and/or services may comprise routing process/services 244, and an illustrative content distribution network (CDN) process 248, as described herein. Note that while the processes are shown in centralized memory 240, alternative embodiments provide for certain aspects of the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as the Interior Gateway Protocol (IGP) (e.g., Open Shortest Path First, "OSPF," and Intermediate-System-to-Intermediate-System, "IS-IS") as IGP services, the Border Gateway Protocol (BGP), etc., as will be understood by those skilled in the art. These functions may be configured to manage routing and forwarding information databases/tables (data structures 245) containing, e.g., data used to make routing and forwarding decisions. Notably, routing services 244 may also perform functions related to virtual routing protocols, such as maintaining virtual routing/forwarding (VRF) instances (illustratively a component of tables 245) as will be understood by those skilled in the art. Note further that certain devices 200 within the network 100 may simply connect to intelligent routing devices, and as such, their corresponding routing process 244 may be configured merely to communicate with such intelligent routing devices, for example, to receive IP address configuration, reach domain name servers (DNSs), etc., as will be understood by those skilled in the art.

CDN process 248 contains computer executable instructions executed by the processor 220 to perform functions provided by one or more CDN protocols, depending upon the executing device's role in a CDN, in accordance with conventional techniques and in accordance with extensions provided by one or more embodiments described herein. For instance, as noted above, the distribution of content often relies upon a CDN (content distribution network or content delivery network) where content is cached closer to the client such that the load demands are off-loaded from an Origin Server. In particular, a CDN is a large distributed system of servers deployed in multiple data centers across the Internet to serve content to end-users (client devices) with high availability and high performance. Examples of content served by CDNs may include web objects (text, graphics, URLs and scripts), downloadable objects (media files, software, documents), applications (e-commerce, portals), live streaming media, on-demand streaming media, and social networks.

CDN nodes are usually deployed in multiple locations, often over multiple backbones. Benefits include reducing bandwidth costs, improving page load times, or increasing global availability of content. The number of nodes and servers making up a CDN varies, depending on the architecture, some reaching thousands of nodes with tens of thousands of servers on many remote points of presence (PoPs). Others build a global network and have a small number of geographical PoPs.

As noted above, a content provider or content aggregator will typically refer to a designated CDN that is authorized to distribute the content. From a practical perspective, the designated CDN can only reach a footprint of coverage where it has deployed cache-nodes. The industry has leveraged global CDN's to distribute content across the Internet; however, these designated CDN's are rarely allowed to insert cache-nodes inside a network provider's infrastructure. In fact, many of the larger network providers are building their own CDN infrastructure in order to control content distribution within its own routed domain. The network provider CDN will either need to serve as a designated CDN from the content provider (clients referred to the CDN explicitly) or serve as a delegate CDN to an upstream designated CDN.

Requests for content are typically algorithmically directed to nodes that are best able to serve the request and optimal in some way, such as directing a client request to the service node that is closest to the client, or to the one with the most capacity. That is, when optimizing for performance, locations that are best for serving content to the user may be chosen that are the fewest hops, the least number of network seconds away from the requesting client, or the highest availability in terms of server performance. A variety of algorithms are currently used to route the request, such as Global Server Load Balancing, DNS-based request routing, Dynamic metafile generation, HTML rewriting, and anycasting. Proximity (choosing the closest service node), is currently estimated using a variety of techniques including reactive probing, proactive probing, and connection monitoring.

In particular, as further noted above, the industry has begun the process of establishing methods for delegation of content distribution from an 'upstream' CDN to a 'downstream' CDN and these efforts are being evaluated as a part of the Internet Engineering Task Force's (IETF's) working group CDN-I (content distribution network-interconnection). A number of criteria have been defined as the selection criteria for when a designated CDN should redirect a client to a delegate CDN. These criteria are generally associated with the capability of the delegate CDN such as footprint of coverage, delivery service capabilities, loading, relative costs, and bandwidth thresholds. These attributes tend to be static attributes associated with the delegate CDN or transient state of the delegate CDN, and thus do not address the transient state of the client access that is independent of the CDN state.

A separate initiative addressed by another IETF working group ALTO (application-layer traffic optimization) has focused on the use of network provider identifiers (PID) to associate a client's relative proximity to a set of content distribution resources. The theory is that the client's connected IP address can be associated with a network region and that network region can be assess for its proximity to network regions where content distribution systems exist. As an example, a network region might be identified by a BGP location represented as AS:EXT_COM where the AS is the Autonomous System from the IP address originates and the EXT_COM is the location from which the IP address is assigned.

In conjunction with network proximity and content distribution network interconnection, the designated CDN should be able to refer a client to a delegate CDN's content distribution point that is 'close' to the client. The problem with this model is that the criteria for successful content delivery may not be a function of how close the client is to any given content delivery point that is able to service that type of request.

The decision to delegate a client request for content to a delegate CDN should also consider how the client is connected. The reason for assessing the connection method is to ascertain the viability and cost of successful content delivery. In many cases, the method of connection is inferred by network elements based on the client's assigned IP address; however, this IP address is often re-written by the network infrastructure in order to make the client's request routable. The Network Address Translation (NAT) is commonly done on home gateway routers, hotspot access points, home agents, and packet gateways. The net effect is that the CDN selection criteria cannot assert how the client is connected based on the IP address. The client connection information must be ascertained by the client itself.

Dynamic CDN Selection

The techniques herein provide for dynamic CDN selection based on context from transient criteria. In particular, an HTTP client uses a method to ascertain the client's location on the network relative to the client's preferred content retrieval interface. The location may then be included in the extension-headers of the HTTP GET Request such that a CDN selection function may use the location metadata to redirect the client to the closest content retrieval server.

Specifically, according to one or more embodiments of the disclosure as described in detail below, a client device queries a location server using a client-selected interface for content retrieval from a content distribution network (CDN), and receives a location attribute from the location server based on a location of the client device. The client device then presents the location attribute to a CDN selector within a first content retrieval request, and in response, may receive a redirection from the CDN selector to a selected content source based on the location attribute. As such, the client device may then initiate a second content retrieval request to the selected content source. Also, as described below, a CDN selector receives a content retrieval request from a client device, and determines that the content retrieval request contains a location attribute indicating a location of the client device. Based on the location attribute, the CDN selector selects a content source, and redirects the client device to the selected content source.

Illustratively, the techniques described herein may be performed by hardware, software, and/or firmware, such as in accordance with the CDN process 248, which may contain computer executable instructions executed by the processor 220 to perform functions relating to the techniques described herein. For example, the techniques herein may be treated as extensions to conventional CDN protocols, and as such, may be processed by similar components understood in the art that execute those protocols, accordingly.

Operationally, the techniques herein allow the client to assert how it is connected at the time the client is initiating the request for content. Note that the client is first connected to a content portal which provides the client with a Uniform Resource Identifier (URI) that is determined a prior to the client connection. The portal URI is a Reference URI that is statically configured independent of the client's location and connection method; however, the portal may ascertain the type of device that the client will use to render media and the permissions for the subscriber to access the media. Three classes of attributes may be defined: asset class, subscriber class, and environment class.

The asset class and subscriber class have attributes that are deterministic at the time the client is reviewing their options for content retrieval. The rules associated with the asset class are based on contracts established in advance such as where content can be distributed, in what formats (e.g., device/OS based), and when the content can be distributed. The subscriber class also has deterministic attributes including the subscriptions, eligible devices, the user identities, and approved methods. The last class includes environmental attributes that are dynamically determined either at the time of session initialization or content retrieval. The first case is rather straightforward to address as the portal can ascertain the clients device type, operating system, rendering options, and security credentials. The two environmental attributes that the portal cannot definitively assess is the client's location and access methodology. While an initial assessment can be made, these attributes may change due to the client's mobility. Indeed, the client may be moving from one location to another while continuing the retrieval of long-format content. Likewise, the client's access method may vary over time even if the client doesn't move (e.g., wireless signal quality variances). The combination of these two dynamic client attributes may make the persistent assignment of a content delivery point sub-optimal.

As an example, a client that initializes a session for content retrieval using macro wireless network infrastructures (e.g., cellular, 3g/4g) may be assigned a delegate CDN managed by (or closer to) the wireless network provider. Once the client moves closer to the home-based WiFi access infrastructure, the client may automatically switch to the WiFi access infrastructure. Of course, the transport sessions assigned using the previous IP address assignment will be torn down. The client can re-initialize the HTTP GET Request using the Absolute URI provided as a result of the CDN selection process (provided the content server is not using the source IP address as the credential and accepts the request from a different source IP address). In this case, the content retrieval is sub-optimal; the client will be retrieving content from the delegate CDN where a closer CDN infrastructure may exist. Alternatively, according to the techniques herein, the client can re-initialize the HTTP GET Request to the cached Reference URI provided by the portal. This will allow the client's environment to be reassessed by a CDN selection process prior to re-direction. The CDN selection process may redirect the client to the appropriate CDN using the client's current connection infrastructure. In this case, the proximity of the client may be used.

The introduction of seamless mobility means that the client will be able to transition between connection methods without dropping the assigned IP address; however, the underlying infrastructure connecting the client may be changed as well as location to which the client is connected. Proxy Mobile IP routing (PMIP) is one method for handling the transport hand-off without causing the client to re-initialize their session. The perceived 'network location' of the client may not change because the client's PMIP session is anchored at a specific location in the network; however, the access infrastructure has changed. In this case, the policy of content distribution may determine the available content formats that the client is allowed to retrieve. The same title may be available in multiple formats and the context manager may redirect the client to a more appropriate version, deny the client access, or alert the client that the cost of content delivery is going to change. An example of this is a scenario where a client moves from a WiFi connected access point to a 3g or 4g access method where the billing model will change.

Finally, the mobile clients are becoming more sophisticated in their ability to maintain multiple connections to the network via various access infrastructures. Mobile applications can be coded to request a specific access infrastructure. The mobile operating system will effectively establish multiple access connections on behalf of the applications or set of applications. Indeed, the mobile handset is assigned multiple IP addresses—one for each access infrastructure. Most applications written for mobile handsets today will call upon only one of the access infrastructures or a generic mapping connection (MAPCON) that will use any available and eligible access infrastructure. This is common today where the majority of mobile handsets applications will use the default Internet connection which will switch between WiFi, 4G, or 3G in that order of preference. In most cases, the client will be assigned a new IP address for each access infrastructure transition. The next wave of mobility connections will leverage multiple access infrastructures simultaneously. Instead of the client using one or the other access infrastructures, the client will use multiple access infrastructures simultaneously. The client may request content using the well-connected macro wireless network (3g/4g) while initiating the content retrieval using the sparsely-connected and faster micro wireless network provided it is available. In this scenario, the initial client request appears to be originating from a network location on the macro wireless network; however, the context manager needs to be informed that the content retrieval will actually take place from an alternate access method and a more suitable location may be chosen as the content delivery point. The absence of the client 'hint' in the initial content request (unlike one or more embodiments as described herein) will lead the CDN selection to redirect the client to the delegate CDN associated with the macro wireless network. This will be a sub-optimal delivery method and, most likely, will be very expensive. In contrast, according to the techniques described below, the mobile client may provide a 'hint' that an alternate network access is available (trusted WiFi) in which case the URL redirect will provide the client with a content location that is more appropriate for that access connection. At any time, the access to the sparsely-connected access infrastructure may fail (i.e. client moved away from trusted WiFi) in which case the client will restart the content request using the macro wireless network (3g/4g). The CDN selector will now use the hint provided by the client to redirect the client to the delegate CDN on the macro wireless network.

According to the techniques herein, the key principle to successfully redirecting the client is where the location and access 'hint' is conveyed to the CDN selector. Content distribution systems typically rely upon one of two methods for redirecting a client to a given CDN and this is characterized in the CDN-I work at DNS Redirection and HTTP Redirection. Initially, DNS Redirection was the principle method in use for web services; however, the use of HTTP facilitated more granular control over redirection process. One or more embodiments herein leverage standard HTTP redirection processes based on HTTP 30x response codes. An assumption is made that the client will be forced to execute at least one redirection because the content portal is decoupled from the decision process of where to direct the client. The portal provides the client with an Reference URI that simply points the client to the CDN selection function. The client initializes the content retrieval by opening an HTTP GET Request to the CDN selection function. The CDN selection function will use the information in the HTTP GET Request to discern where to redirect the client. The available attributes typically include the source IP address of the request and the URL reference. By default, the source IP address will either be the IP address of the TCP/IP stack used by client for the HTTP request, an HTTP proxy IP address, or a NAT server IP address. In all cases, the location of the request is inferred from the source IP address and the CDN selector will use that location to redirect the client. An objective of the techniques herein, therefore, is to provide the CDN selector with an explicit network location in the initial content retrieval request that is not associated with the source IP address of the HTTP GET request or any proxy through which the initial request is forwarded.

Figure 3:
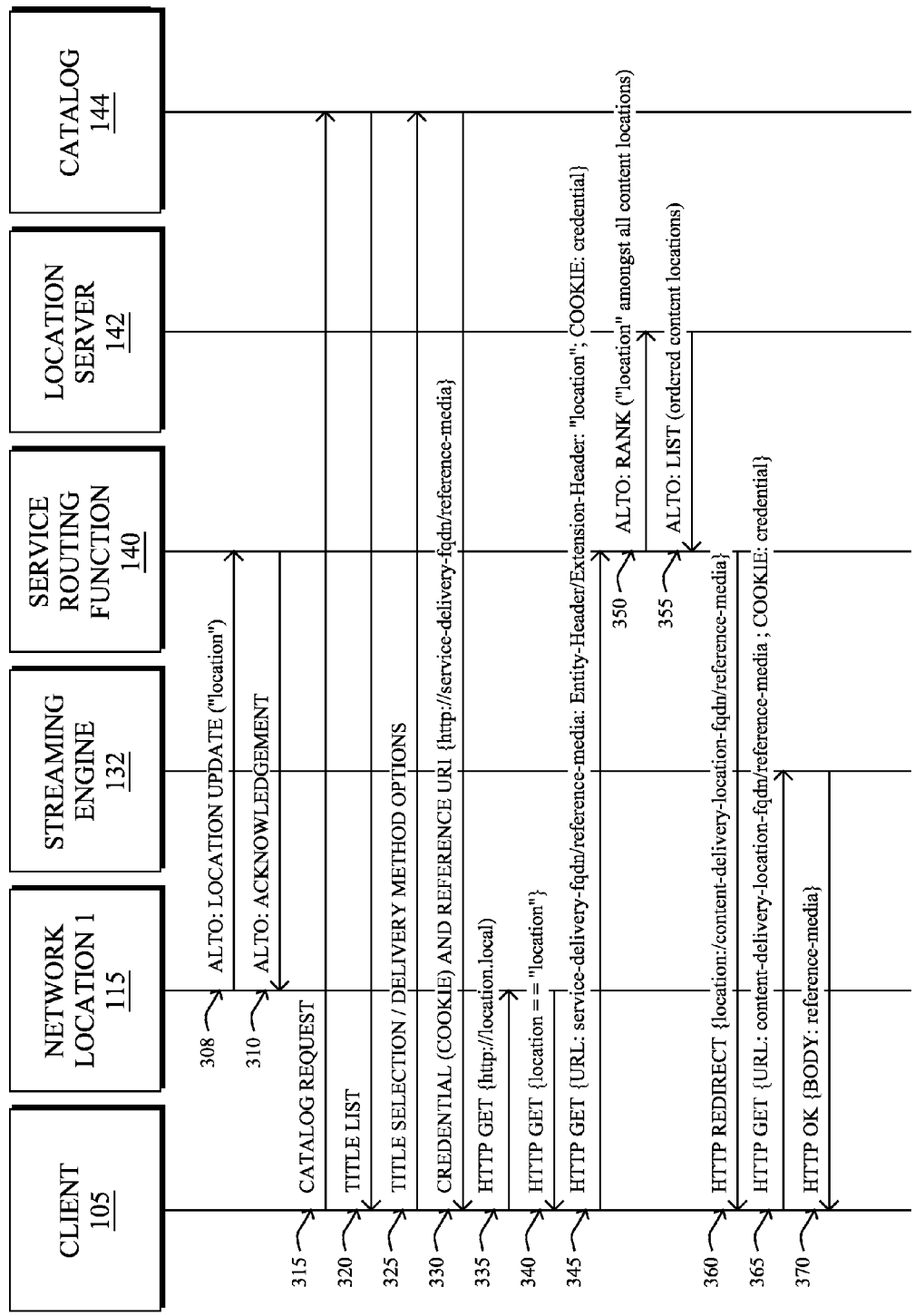
FIG. 3 illustrates an example message exchange diagram for dynamic CDN selection based on context from transient criteria.

FIG. 3 illustrates an example message exchange diagram for dynamic CDN selection based on context from transient criteria in accordance with one or more embodiments herein. In particular, the diagram of FIG. 3 illustrates the messages passed between a client 105, a network location server "1" 115, a content source ("streaming engine") 132, a CDN selector ("service routing function") 140, a centralized location server 142, and a catalog 144. First, in exchange 305, the network location server 115 sends a location update with its location (e.g., using the ALTO protocol), and receives an acknowledgment in 310. When a client performs a catalog request 315, it may receive a list of items (e.g., titles) from the catalog in 320, and may then initiate a title selection in 325. Notably, the title selection request may also include other information, such as the delivery method options. The catalog then returns the credentials (e.g., cookies) and the reference URI for the requested content in 330.

Using the selected client interface, the client 105 may then query the location server 115 in 335 to determine a local location through which the client-selected interface is connected to the CDN. Note that an illustrative embodiment of the query is an HTTP GET message. The location server will assess the client's proximity to a defined location that correlates with locations referenced by the CDN selector. The semantics of location can vary as long as the location server and CDN selector agree to the chosen semantics. As an example, the client's proximity request to the location server may result in a response indicating a BGP AS and Extended Community. This attribute may be encoded as a string such as "xx:yyyy".

Figure 4:
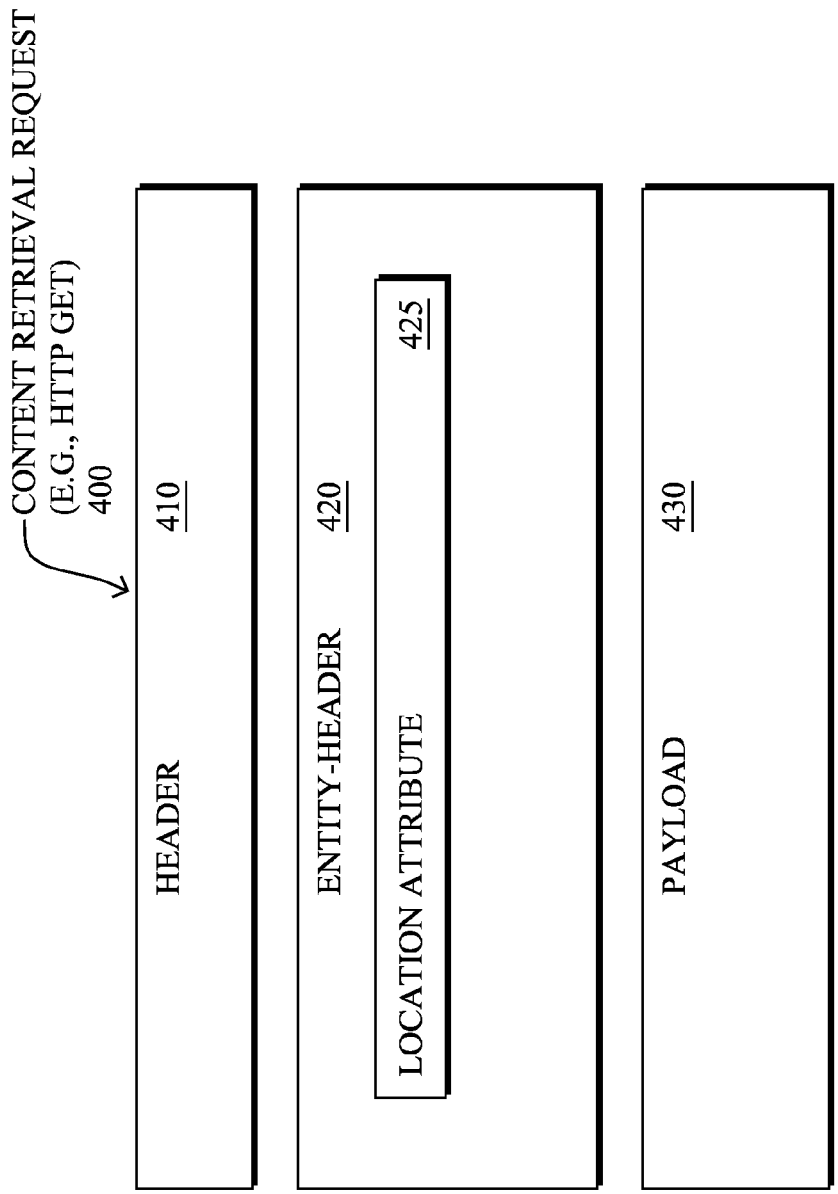
FIG. 4 illustrates an example content retrieval request message.

Once receiving the location attributes from the location server in 340, the client will prime the content retrieval request (e.g., HTTP GET Request) with the location attribute (e.g., a string) that is understood by the CDN Selection function in 345. Notably, the standard HTTP GET Request method provides a manner for extending the HTTP Request fields through Entity-Headers. FIG. 4 illustrates an example content retrieval request message 400, e.g., an HTTP GET message. In particular, in addition to a standard header 410 and standard payload 430, an additional entity-header 420 may be populated with the location attribute 425 as described herein. While the standard entity-headers do not provide an explicit means of hinting the location, they do allow extension-headers to be associated with the requested Reference URI. The advantage of using the entity-header and its extensions is that proxy servers must relay the header even if they don't understand the header. As noted, only the CDN selector and client need to understand the context of the extension-header.

Referring again to FIG. 3, the CDN selection function will recognize the extension-header and use this as the criteria for redirecting the client to the appropriate content source. This criteria may be one of many criteria; therefore, the omission of the extension-header will allow the CDN selection process to use the remaining criteria in its preferred order. The inclusion of the extension-header allows the CDN selection process to prioritize this location criteria over other default criteria that is inferred by the client request. In particular, in exchange 350 and 355, The CDN selection function will assess the client's stated location against the known locations of the content sources, and redirect the client to one of those sources for the content retrieval in 360. As such, in 365 the client can now initiate the content retrieval request to the specified content source using the Absolute URI provided by the CDN selection function while using the client's chosen interface, and the content is retrieved in 370 (note, this content retrieval will be optimized for retrieval).

Given that the client is mobile, the client's chosen interface may experience a loss of connection, or a better connection may become available. The content retrieval via the previously chosen interface will be disrupted and the TCP session torn down. The available interfaces used for the content retrieval has now changed and inherently the source IP address will change. The client does not need to reconnect to the portal to re-initialize the stream; the credentials provided by the portal and the reference URL are still valid. However, the client does need to reassess the best location to retrieve the content.

Figure 5:
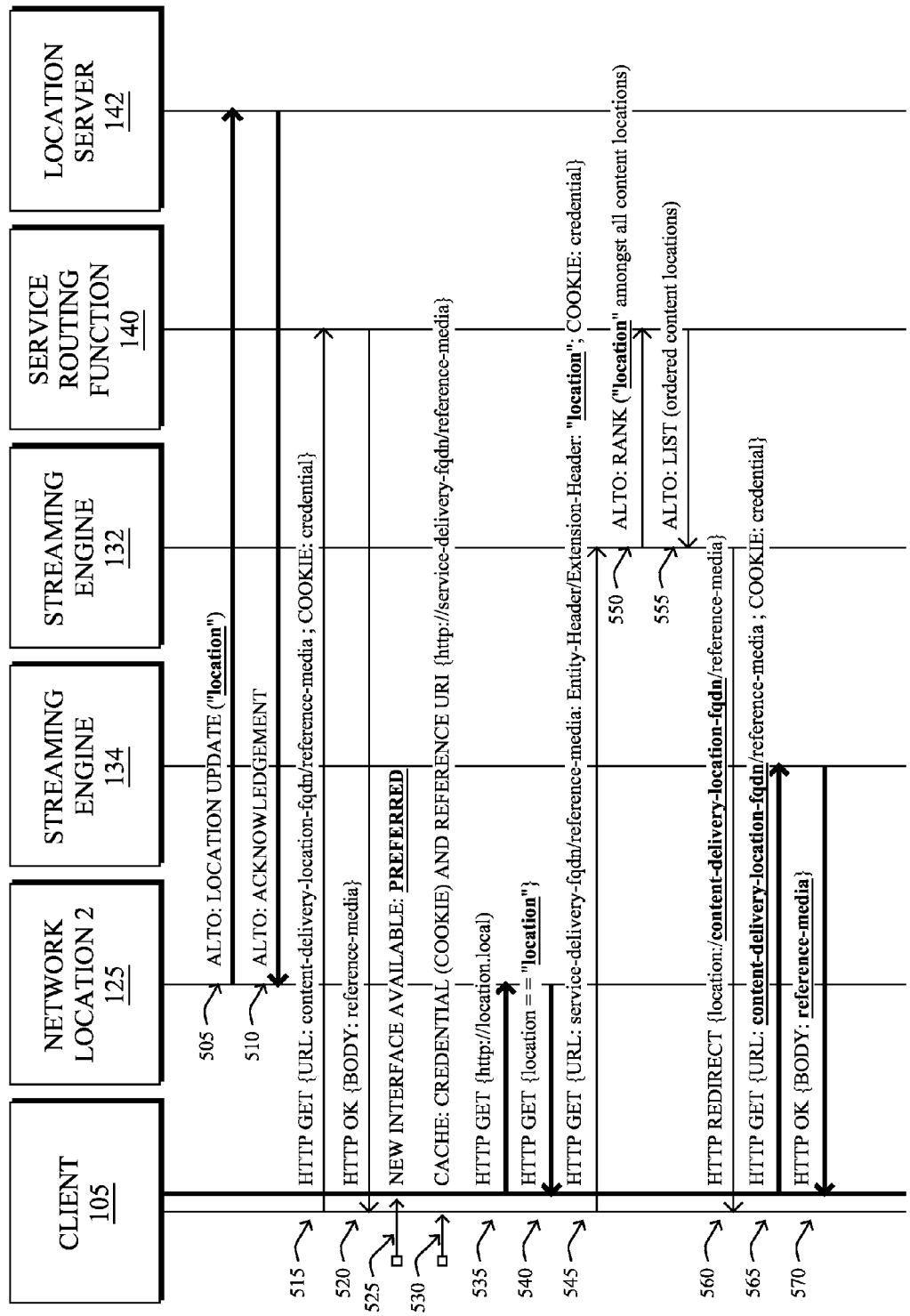
FIG. 5 illustrates another example message exchange diagram for dynamic CDN selection based on context from transient criteria.

As shown in FIG. 5, the client can choose a new interface for the content retrieval process (shown as BOLD lines and underlined words) and repeat the location request query. In particular, a second network location server 125 updates the location server 142 with its location (505/510), and the client is shown as receiving content from the original streaming engine 132 in 515/520. Once the new interface ("preferred") is determined in 525 (whether from a failure of the first, or in response to the new interface being a better choice), the old credentials and URI are cached in 530, and a new client location is identified by the location server in 535/540. From this, the client may now initialize a new HTTP GET Request to the CDN selector in 545 with the updated location field (e.g., included in the entity-header's extension-header field). Again, the CDN selection function (550/555) will redirect the client in 560 to the most appropriate content retrieval location based on the updated client location. The client may then send the content retrieval request in 565 to the selected CDN content source (streaming engine 134), and receives the content from the new source in 570.

Notably, since the semantics of the 'location' attribute (e.g., in the extension-header) are unstructured, the CDN selector and location server simply need to agree upon the structure of those semantics. The example given previously used the AS:EXT_COM string to represent a location on the macro network. However, any explicitly defined location identification may be used as well. For instance, an alternate example is where the client uses a private location server. Consider the case where the home network hosts a private location server. The semantics of the 'home' locations are understood by the CDN selector since these are managed locations. The client queries the private location server which responds with a defined 'home' location. The client now includes the home location string in the HTTP GET Request directed to the CDN selector. The CDN selector recognizes the client is in their 'home' location even though the client's source IP address may have been modified in the home as well as in the network. The CDN selector may now redirect the client to a home content retrieval server. The client will now initiate the HTTP GET Request to the home content retrieval server which may be a content server, proxy, or caching proxy server. If the content is local, the GET response can be serviced without requiring the content retrieval from the network. If the content is not present, the home caching proxy may initiate its own content retrieval via a similar HTTP GET Request to the CDN selector.

Figure 6:
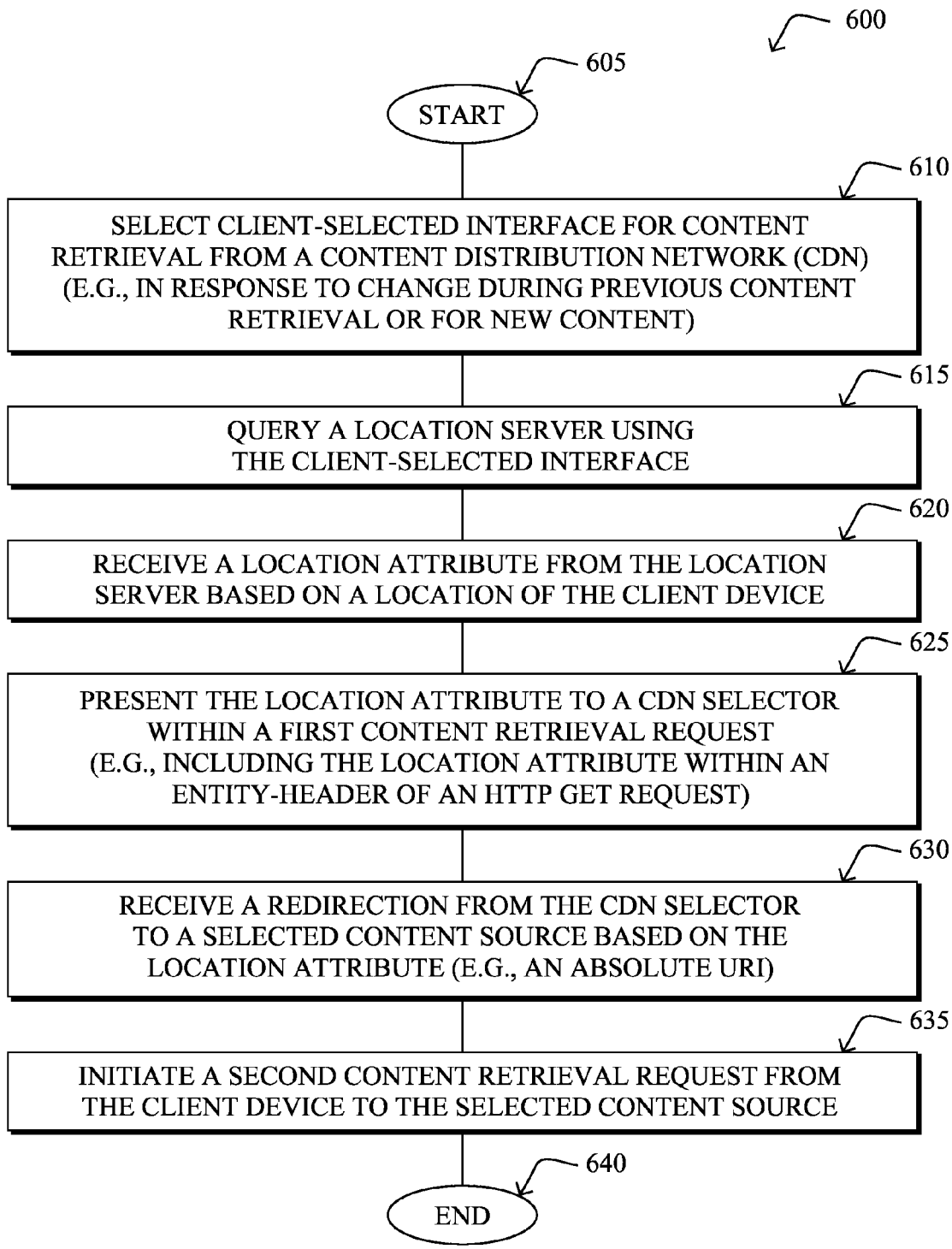
FIG. 6 illustrates an example simplified procedure for dynamic CDN selection based on context from transient criteria, particularly from the perspective of a client device.

FIG. 6 illustrates an example simplified procedure 600 for dynamic CDN selection based on context from transient criteria in accordance with one or more embodiments described herein, particularly from the perspective of a client device 105. The procedure 600 may start at step 605, and continues to step 610, where, as described in greater detail above, a client device selects a client-selected interface for content retrieval from a CDN 130, such as in response to a request for new content, or else an interface change during a previous content retrieval. Using the client-selected interface, the client device may query a location server (e.g., 115) in step 615, and may correspondingly receive a location attribute from the location server based on a location of the client device in step 620. As described above, the client device may then present the location attribute to a CDN selector 140 within a first content retrieval request in step 625, such as by including the location attribute 425 within an entity-header 420 of an HTTP GET request 400. In step 630 the client device may receive a redirection from the CDN selector to a selected content source (e.g., 132) based on the location attribute, such as in the form of an absolute URI, as noted above. Accordingly, in step 635, the client device may initiate a second content retrieval request to the selected content source, and the procedure 600 ends in step 640 with the initiated content retrieval. Notably, in response to a change of the selected interface, the procedure may restart at step 610 to generate a new request based on the new network location, as described above.

Figure 7:
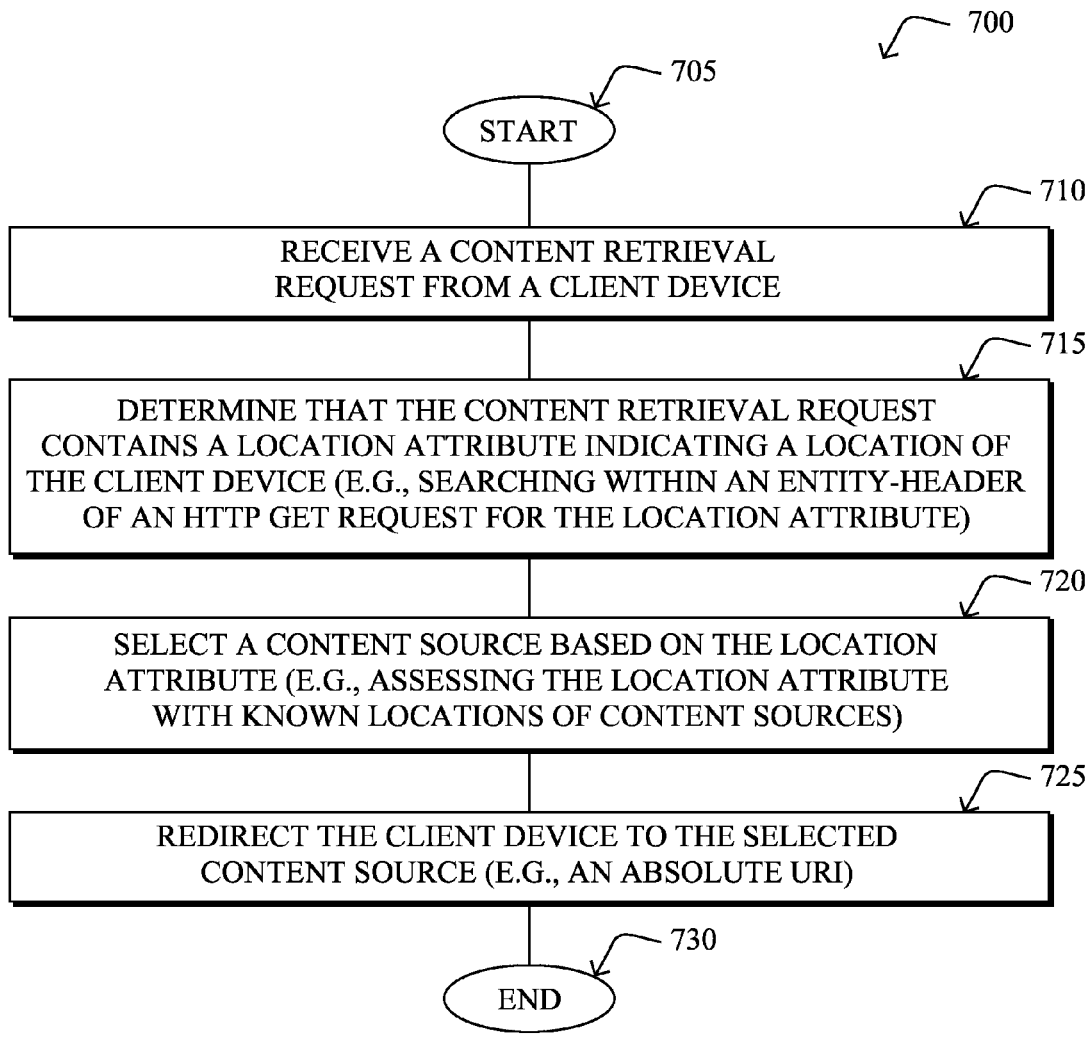
FIG. 7 illustrates another example simplified procedure for dynamic CDN selection based on context from transient criteria, particularly from the perspective of a CDN selector.

In addition, FIG. 7 illustrates another example simplified procedure 700 for dynamic CDN selection based on context from transient criteria in accordance with one or more embodiments described herein, particularly from the perspective of a CDN selector 140. The procedure 700 may start at step 705, and continues to step 710, where, as described in greater detail above, the CDN selector receives a content retrieval request from a client device, and in step 715 determines that the content retrieval request contains a location attribute indicating a location of the client device (e.g., searching within an entity-header of an HTTP GET request for the location attribute). Based on the location attribute, the CDN selector may select a content source in step 720, such as by assessing the location attribute with known locations of content sources as described above. Accordingly, in step 725, the CDN selector may redirect the client device to the selected content source (e.g., an absolute URI), and the procedure 700 ends in step 730. Notably, in response to determining that there is no location attribute in the content retrieval request (e.g., in step 715), the CDN selector may use default attributes for selecting the content source, as mentioned above.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for dynamic CDN selection based on context from transient criteria. In particular, the techniques herein allow the client to maintain a stateless representation of the content retrieval point (the reference URL) provided by a content portal. For instance, the client can dynamically indicate the preferred content retrieval interface based on the client's policy (e.g. cost, speed, preference), and the preferred content retrieval interface can be associated with a location that is semantically defined by an operator. Since the definition of location is unstructured, the techniques herein allow many different forms of location to be specified by the content distribution operator. Notably, according to the techniques herein, the transient nature of mobile client interfaces means that content retrieval processes may be interrupted; however, the client can reinitialize the content retrieval using any of the available interfaces. The best location for the content retrieval is not inferred from the client's source IP address (which is often modified); it is explicitly defined by the client and understood by the CDN selection function.

Notably, in the absence of a location server, the client's inability to include a 'location' in the HTTP GET Request extension-header, or the inability of the CDN selector to process the extension-header may lead to the default behavior of content selection where the CDN selector uses the apparent source IP address of the client to infer the location. Thus, the method facilitates resiliency through a fall-back to the inherent methods of HTTP clients.

While there have been shown and described illustrative embodiments that provide for dynamic CDN selection based on context from transient criteria, it is to be understood that various other adaptations and modifications may be made within the spirit and scope of the embodiments herein. For example, the embodiments have been shown and described herein with relation to particular protocols and terminologies. However, the embodiments in their broader sense are not as limited, and may, in fact, be used with other types of networks, protocols, and terms that may provide content from localized servers based on context from transient criteria (e.g., client location).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   querying, by a client device, a location server using a client-selected interface for content retrieval from a content distribution network (CDN);
   receiving a location attribute from the location server based on a location of the client device, wherein the location attribute is encoded as a string;
   presenting the location attribute to a CDN selector within a first content retrieval request, wherein the first content retrieval request is a hyper-text transport protocol (HTTP) GET request;
   including the location attribute within an entity-header of the first content retrieval request;
   receiving a redirection from the CDN selector to a selected content source based on the location attribute; and
   initiating a second content retrieval request from the client device to the selected content source, wherein the second content retrieval request is an HTTP GET request.

2. The method as in claim 1, wherein the redirection comprises an absolute uniform resource identifier (URI).

3. The method as in claim 1, further comprising:
   determining a change in the client-selected interface for content retrieval;
   in response, presenting an updated location attribute to the CDN selector to receive another redirection to a new selected content source based on the updated location attribute; and
   initiating a new content retrieval request from the client device to the new selected content source.

4. The method as in claim 1, wherein the location attribute is selected from a group consisting of: a border gateway protocol (BGP) autonomous system (AS) and extended community; and an explicitly defined location identification.

5. A method, comprising:
   receiving, at a content distribution network (CDN) selector, a content retrieval request from a client device, wherein the content retrieval request is a hyper-text transport protocol (HTTP) GET request;
   searching within an entity-header of the HTTP GET request for a location attribute;
   determining that the content retrieval request contains the location attribute indicating a location of the client device, wherein the location attribute is encoded as a string;
   selecting a content source based on the location attribute; and
   redirecting the client device to the selected content source.

6. The method as in claim 5, wherein the redirection comprises an absolute uniform resource identifier (URI).

7. The method as in claim 5, wherein selecting comprises:
assessing the location attribute with known locations of content sources.

8. The method as in claim 5, further comprising:
determining that there is no location attribute in the content retrieval request; and
in response, using default attributes for selecting the content source.

9. The method as in claim 5, wherein the location attribute is selected from a group consisting of: a border gateway protocol (BGP) autonomous system (AS) and extended community; and an explicitly defined location identification.

10. An apparatus, comprising:
one or more network interfaces to communicate with a content distribution network (CDN) as a client device;
a processor coupled to the network interfaces and adapted to execute one or more processes; and
a memory configured to store a process executable by the processor, the process when executed operable to:
  query a location server using a client-selected interface for content retrieval from the CDN;
  receive a location attribute from the location server based on a location of the client device, wherein the location attribute is encoded as a string;
  present the location attribute to a CDN selector within a first content retrieval request, wherein the first content retrieval request is a hyper-text transport protocol (HTTP) GET request;
  include the location attribute within an entity-header of the first content retrieval request;
  receive a redirection from the CDN selector to a selected content source based on the location attribute; and
  initiate a second content retrieval request to the selected content source, wherein the second content retrieval request is an HTTP GET request.

11. The apparatus as in claim 10, wherein the redirection comprises an absolute uniform resource identifier (URI).

12. The apparatus as in claim 10, wherein the process when executed is further operable to:
  determine a change in the client-selected interface for content retrieval;
  in response, present an updated location attribute to the CDN selector to receive another redirection to a new selected content source based on the updated location attribute; and
  initiate a new content retrieval request from the client device to the new selected content source.

13. An apparatus, comprising:
one or more network interfaces to communicate with a content distribution network (CDN) as a CDN selector;
a processor coupled to the network interfaces and adapted to execute one or more processes; and
a memory configured to store a process executable by the processor, the process when executed operable to:
  receive a content retrieval request from a client device, wherein the content retrieval request is a hyper-text transport protocol (HTTP) GET request;
  search within an entity-header of the HTTP GET request for a location attribute;
  determine that the content retrieval request contains the location attribute based on a location of the client device, wherein the location attribute is encoded as a string;
  select a content source based on the location attribute; and
  redirect the client device to the selected content source.

14. The apparatus as in claim 13, wherein the redirection comprises an absolute uniform resource identifier (URI).

15. The apparatus as in claim 13, wherein the process when executed to select is further operable to:
assess the location attribute with known locations of content sources.

16. The apparatus as in claim 13, wherein the process when executed is further operable to:
determine that there is no location attribute in the content retrieval request; and
in response, use default attributes for selecting the content source.

\* \* \* \* \*